United States Patent
Kamiya

(10) Patent No.: US 10,479,429 B2
(45) Date of Patent: Nov. 19, 2019

(54) PROCESS FOR MANUFACTURING BUMPER REINFORCEMENT

(71) Applicant: TOYODA IRON WORKS CO., LTD., Toyota-shi, Aichi (JP)

(72) Inventor: Naoki Kamiya, Toyota (JP)

(73) Assignee: TOYODA IRON WORKS CO., LTD., Toyota-shi (JP)

( * ) Notice: Subject to any disclaimer, the term of this patent is extended or adjusted under 35 U.S.C. 154(b) by 110 days.

(21) Appl. No.: 15/757,576

(22) PCT Filed: Sep. 2, 2016

(86) PCT No.: PCT/JP2016/075746
§ 371 (c)(1),
(2) Date: Mar. 5, 2018

(87) PCT Pub. No.: WO2017/038960
PCT Pub. Date: Mar. 9, 2017

(65) Prior Publication Data
US 2018/0251174 A1 Sep. 6, 2018

(30) Foreign Application Priority Data
Sep. 3, 2015 (JP) .................................. 2015-173839

(51) Int. Cl.
*B62D 65/16* (2006.01)
*B60R 19/04* (2006.01)
(Continued)

(52) U.S. Cl.
CPC ............. *B62D 65/16* (2013.01); *B21D 24/00* (2013.01); *B60R 19/04* (2013.01); *B60R 19/18* (2013.01);
(Continued)

(58) Field of Classification Search
CPC ........ B62D 65/16; B21D 24/00; B60R 19/04; B60R 19/18; B60R 19/34; B60R 2019/1813
See application file for complete search history.

(56) References Cited

U.S. PATENT DOCUMENTS

2009/0273197 A1  11/2009  Muskos

FOREIGN PATENT DOCUMENTS

JP  2001-180398 A   7/2001
JP  2007-038756 A   2/2007
(Continued)

OTHER PUBLICATIONS

Nov. 29, 2016 International Search Report issued in Patent Application No. PCT/JP2016/075746.
(Continued)

*Primary Examiner* — Moshe Wilensky
(74) *Attorney, Agent, or Firm* — Oliff PLC

(57) ABSTRACT

A process for manufacturing a bumper reinforcement having a length, wherein the bumper reinforcement is disposed in front or rear of an automobile body with the length directed in transverse direction of the automobile body. The process includes joining a central part and lateral parts of unequal thicknesses to form a planar tailored blank. The process further includes press forming the tailored blank by hot pressing to produce a bumper reinforcement having a length and an M-shaped open cross section, the bumper reinforcement being curved at end portions of the length toward the open side of the cross section relative to a central portion.

17 Claims, 6 Drawing Sheets

(51) Int. Cl.
*B60R 19/34* (2006.01)
*B60R 19/18* (2006.01)
*B21D 24/00* (2006.01)

(52) U.S. Cl.
CPC ...... *B60R 19/34* (2013.01); *B60R 2019/1813* (2013.01)

(56) References Cited

FOREIGN PATENT DOCUMENTS

| JP | 2010-023658 A | 2/2010 |
|----|---------------|--------|
| JP | 2010-509122 A | 3/2010 |
| JP | 2013-018297 A | 1/2013 |
| JP | 2014-058221 A | 4/2014 |

OTHER PUBLICATIONS

Jun. 19, 2018 Office Action issued in Japanese Patent Application No. 2015-173839.

[Step of Preparing Blanks]

[Step of Preparing a Tailored Blank]

[Step of Hot Pressing]

[Product]

US 10,479,429 B2

PROCESS FOR MANUFACTURING BUMPER REINFORCEMENT

FIELD OF THE DISCLOSURE

The present Disclosure relates to a process for manufacturing a bumper reinforcement and, more particularly, to a process for manufacturing a bumper reinforcement including forming a tailored blank by hot press into a predetermined M-shaped open cross section, wherein the tailored blank include a central part and lateral parts with different thicknesses.

DESCRIPTION OF THE RELATED ART

The front or rear of the automobile body includes a bumper structure for receiving impact load in the event of a vehicle collision. The bumper structure includes a bumper reinforcement as a core element. The bumper reinforcement is arranged in the automobile body with the length oriented in the transverse direction of the automobile body, and is supported at each lateral end to a frame member of the automobile body, connected through a bumper support structure.

The bumper reinforcement may be manufactured from a tailored blank for weight reduction (see Japanese Patent Application Publication No. 2001-180398). Typically, the weight reduction is done by reducing the thickness of the lateral parts than the longitudinally central part of the bumper reinforcement in consideration of the nature of vehicle impact load.

Further, various ideas for cross-sectional shapes have been proposed to improve the strength of bumper reinforcements. Examples include a B-shaped cross section (see Japanese Patent Application Publication 2001-180398) and an M-shaped open cross section (see Japanese Patent Application Publication Nos. 2013-18297 and 2007-38756).

The bumper reinforcement, positioned in the front or rear of the car, has end portions curved (or rounded) toward the automobile body for the purpose of styling.

Further, at each end of the bumper reinforcement a bumper support structure is disposed to couple the bumper reinforcement to a frame member of the automobile body. In the front of the automobile, a radiator for cooling the engine is disposed between the two support structures and behind the bumper reinforcement. The bumper support structure typically comprises a crash box that absorbs impact energy. The central portion of the bumper reinforcement has a cross section that is as narrow as possible for better cooling effect of the radiator while ensuring the required strength.

In contrast, the end portions, where the crash boxes are placed, have a wider cross section than the central portion for allowing their attachment. The intermediate portion connecting the central and each end portion have a gradually widening cross section from the central to end portion.

As a consequence, the cross section of the bumper reinforcement has a relatively narrow constant width in the central portion and a relatively wide constant width in the end portions, and in the intermediate portions gradually widens from the central to each end portion.

The bumper reinforcement of such a configuration can be formed by cold or hot pressing.

the bumper reinforcement of the B-shaped cross section as mentioned above, when manufactured by cold pressing of a tailored blank, has the following problems.

First, the central and lateral parts of the tailored blank have a large difference in the amount of springback in the cold press forming due to the different strengths of the welds between them, resulting in difficulty to obtain good accuracy.

Secondly, a zone around the weld that has been heat affected and softened by welding is likely to fracture during the forming. In addition, when a bracket is welded to the bumper reinforcement for improving the yield strength to an impact, the welding needs to be performed by arc welding, which is expensive.

Lastly, because of the B-shaped cross section the crash box attachment surface is opposite to the impact surface, allowing smaller crushable length for the crash box, which is inefficient. Further, when curved by cold forming, wrinkles concentrate in low strength regions. The wrinkles then accumulate, resulting in product defects.

SUMMARY OF THE INVENTION

The inventor, considering the cross-sectional shape, attempted to solve the above-mentioned problem with the B-shaped cross section by forming by hot press into an M-shaped open cross section which could be the most efficient in strength in open cross sections. However, this could not resolve the problem of wrinkles formed during the forming. The inventor then focused to the position of the unequal thickness joint in the tailored blank used, and intensively studied in expectation that the joint position might be related to the occurrence of wrinkles. As a result, the inventor has found that wrinkles can be prevented or reduced by moving the unequal thickness joint of the tailored blank into the intermediate widening section.

The present invention in one aspect provides a process for manufacturing a bumper reinforcement having a length, wherein the bumper reinforcement is disposed in front or rear of an automobile body with the length directed in transverse direction of the automobile body, the process including joining a central part and lateral parts of unequal thicknesses to form a planar tailored blank; and press forming the tailored blank by hot pressing to produce a bumper reinforcement having a length and an M-shaped open cross section, the bumper reinforcement being curved at end portions of the length toward the open side of the cross section relative to a central portion, the bumper reinforcement comprising a central narrower section, end wider sections having a larger width than the central narrower section, and intermediate widening sections gradually widening from the central narrower section to the end wider sections, such that after the hot pressing the joints of unequal thicknesses between the central part and the lateral parts are located within the intermediate widening section.

Thus, in some embodiments, the central part, lateral parts, and the welded portion of the tailored blank have a smaller difference in strength and hence approximately equal amount of springback, resulting in products with good accuracy, and preventing fracture around welds during the forming.

Further, in some embodiments, the low strength portion is eliminated, resulting in a reduced concentration of wrinkles. Thus, since no wrinkles are concentrated in the low strength portion can be prevented or reduce wrinkles. As is the case with ordinary press forming, large wrinkles tend to be formed at the starting point of the widening and curving. However, the unequal thickness joint provides a ridge which separates the wrinkles and disperses them into the central part and lateral parts, thereby preventing or reducing wrinkles.

In one embodiment, crash boxes are preferably mounted between the end wider sections of constant width of the bumper reinforcement and the automobile body. Accordingly, the energy of the collision impact load acting on the bumper reinforcement is absorbed by the crash box.

In another embodiment, the thickness of the central part is preferably larger than the thickness of the lateral parts. Accordingly, the strength of the central part is higher than that of the lateral parts, allowing for securely receiving the impact load.

In another embodiment, the central part and lateral parts are preferably made of the same material. This unifies the material for these structural members of the bumper reinforcement, thereby facilitating procurement.

In another embodiment, a flange is preferably included at the opening of the M-shaped open cross section, and a stiffener bracket is welded to the flange. This improves the strength of the bumper reinforcement due to the bracket attached to the flange. The welding of the bracket may be performed by spot welding, with low cost.

In some embodiments, wrinkles are prevented or reduced during the hot press forming. When the joint of unequal thicknesses in the tailored blank is moved into the intermediate widening section of the bumper reinforcement, the ridge of the unequal thickness joint separates wrinkles being formed during the hot press forming, thereby preventing or reducing wrinkles.

DETAILED DESCRIPTION OF THE INVENTION

Embodiments of the present invention will be described below with reference to the drawings.

Figure 1:
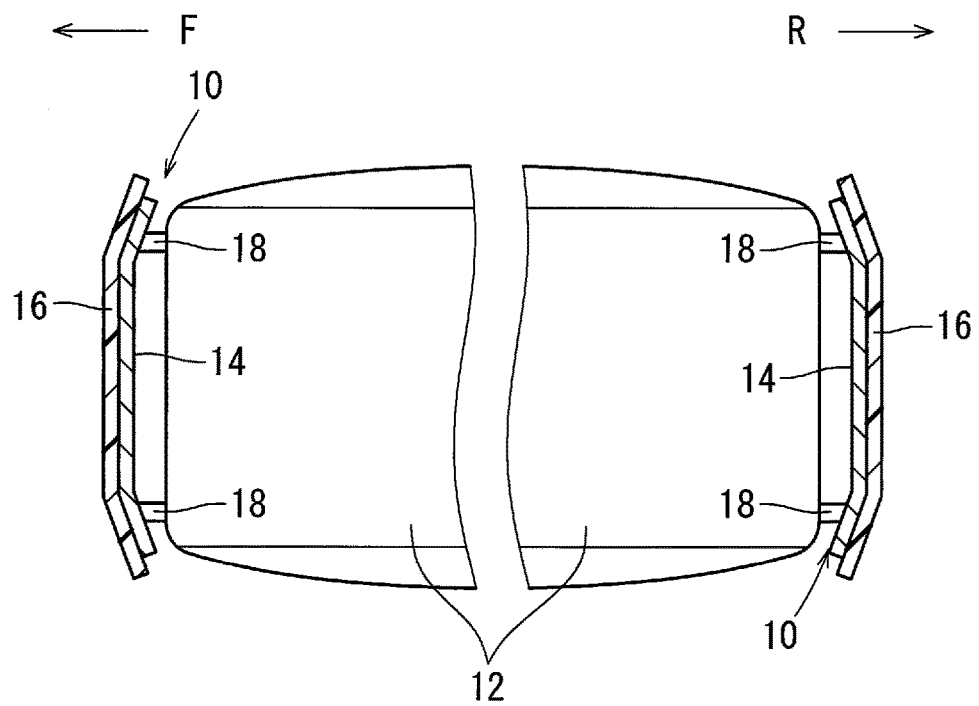
FIG. 1 is a schematic view of the position of a bumper structure within an automobile body.

FIG. 1 shows the position of a bumper structure 10 within an automobile. The bumper structure 10 is typically disposed in the front and rear of the automobile body 12 in the transverse direction of the automobile body 12. FIG. 1 indicates the front of the automobile body 12 with arrow F and the rear with arrow R. The bumper structure 10 may include a bumper reinforcement 14, a bumper cover 16 and a bumper support structure 18. The bumper reinforcement 14 serves as a core that provides strength to the bumper structure 10. The bumper cover 16 is disposed so as to cover the front side of the bumper reinforcement 14. The bumper cover 16 is positioned outermost in the bumper structure 10, and designed in consideration of appearance. The bumper cover 16 is typically formed of plastic suitable for styling.

The bumper support structure 18 is disposed between a frame member (not shown) of the automobile body 12 and the bumper reinforcement 14 at a location in the end portion of the length of the bumper reinforcement 14 (i.e. the lateral end portion of the bumper reinforcement 14 with respect to the automobile body 12). Impact load received by the bumper reinforcement 14 is transferred by the bumper support structure 18 to the automobile body 12, and then received by the automobile body 12. In a preferred embodiment the bumper support structure 18 comprises an element called a crash box which absorbs collision energy.

It should be noted that embodiments will be described hereafter as having the bumper reinforcement 14 disposed in the front of the automobile body 12 for illustrative purposes. However, the bumper reinforcement may be disposed in the rear of the automobile body.

In one embodiment, in a head-on collision of the automobile where an impact load is applied to the central portion of the bumper structure 10 configured as described above, the bumper structure 10 receives the load through the following process.

The impact load is first applied to the bumper cover 16 and then received by the bumper reinforcement 14. The load acting on the bumper reinforcement 14 is then received by the automobile body 12 through the crash boxes disposed as bumper support structures 18 at the end portions of the bumper reinforcement 14. During this the crash boxes 18 absorb collision energy.

Figure 2:
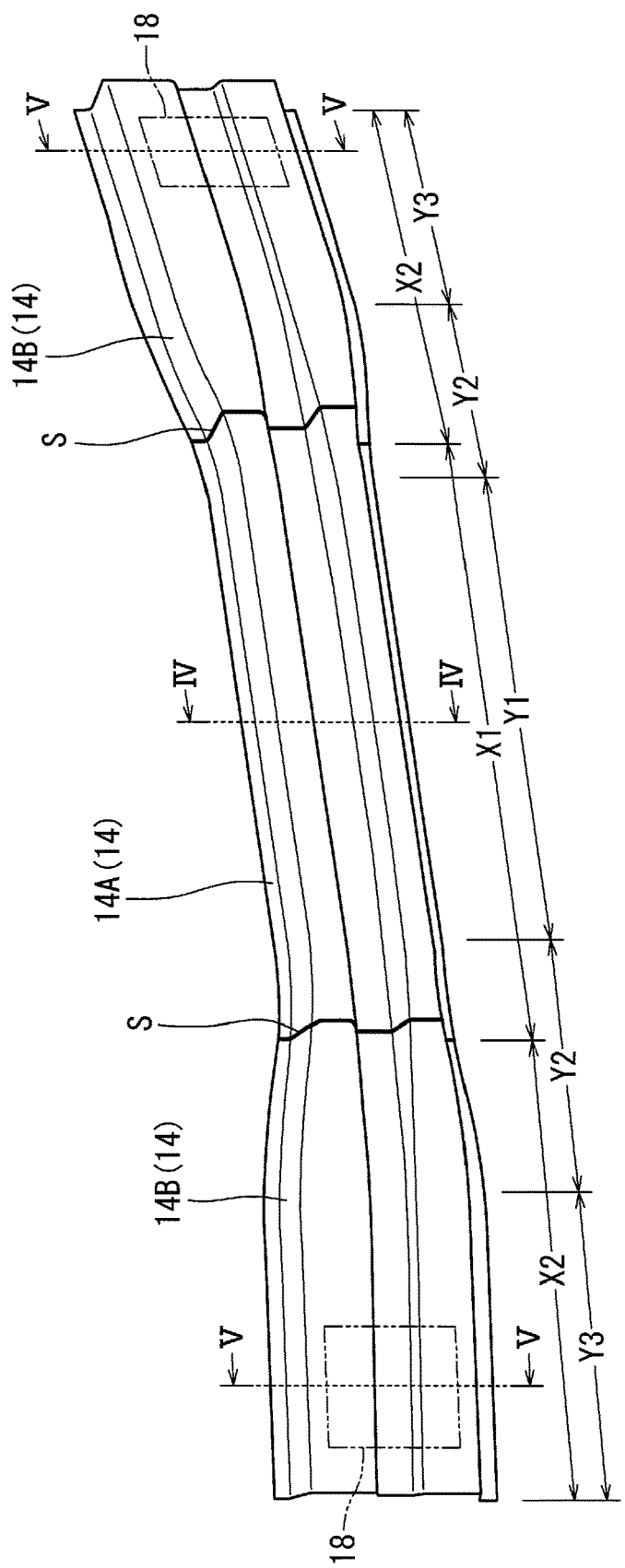
FIG. 2 is a perspective view of a bumper reinforcement seen from the front of the upper according to an embodiment.
Figure 3:
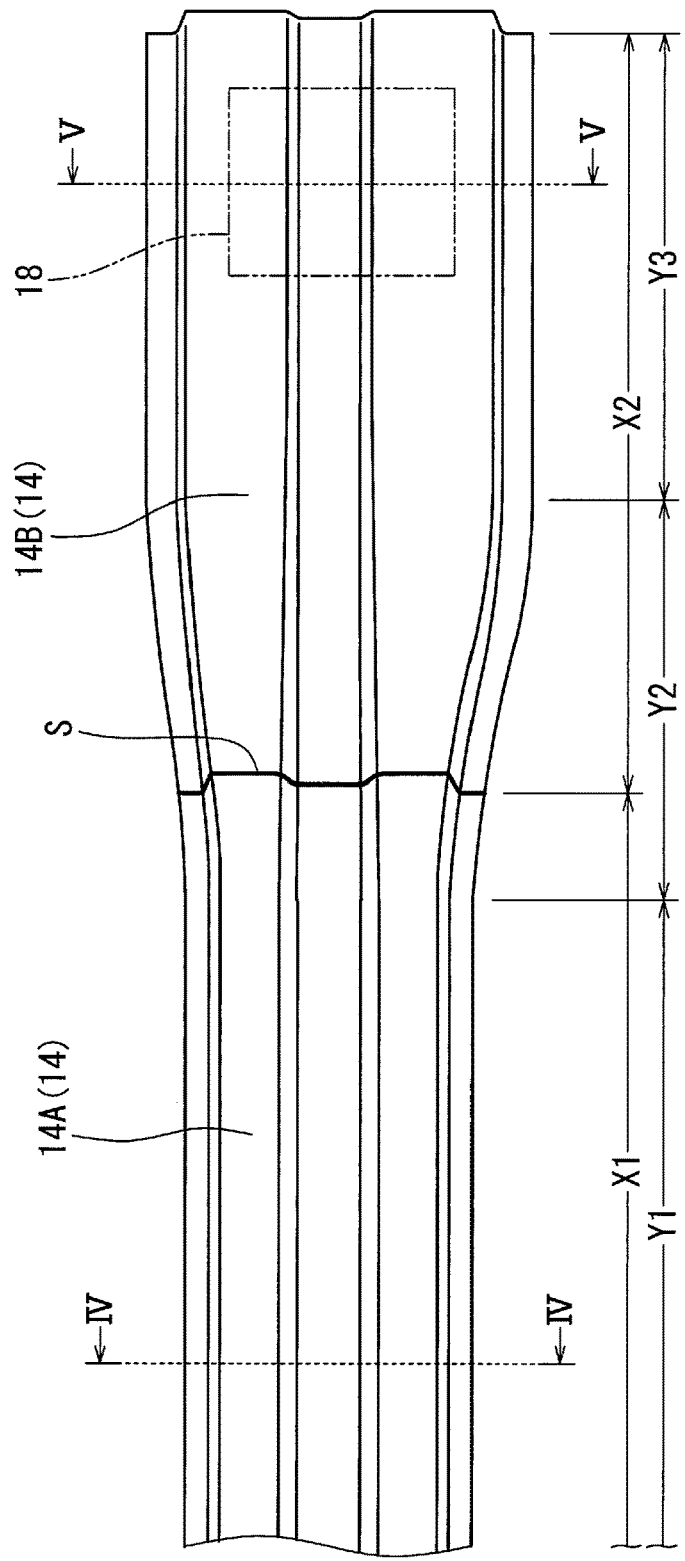
FIG. 3 is a front view of the right half, as seen from the front, of a bumper reinforcement.
Figure 4:
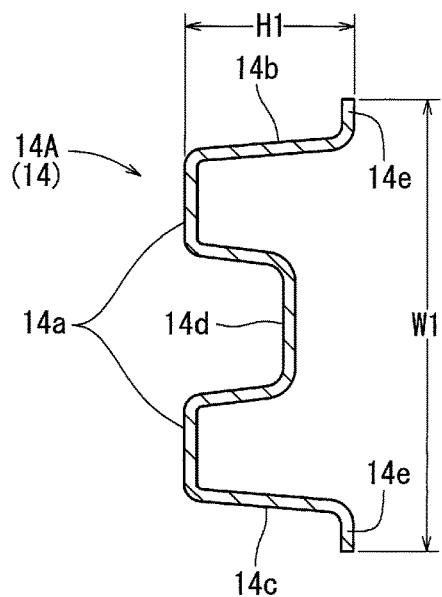
FIG. 4 is a sectional view taken along line IV-IV of FIGS. 2 and 3.
Figure 5:
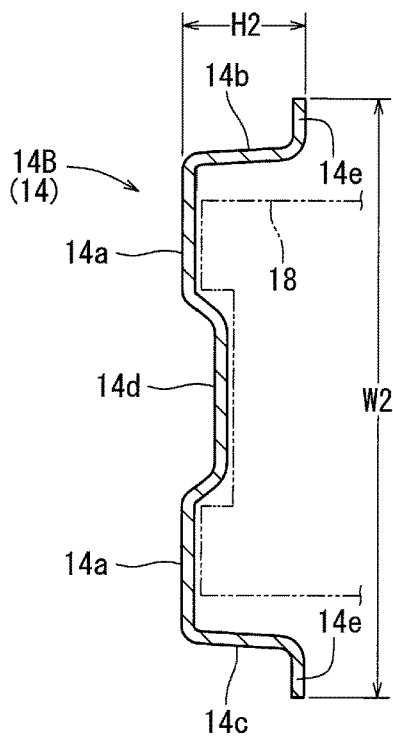
FIG. 5 is a sectional view taken along line V-V of FIGS. 2 and 3.

FIGS. 2-5 show the structure of the bumper reinforcement 14 produced by a method in an embodiment. FIG. 2 is a perspective view of a bumper reinforcement as seen from the upper front; FIG. 3 is a front view of the right half, as seen from the front, of a bumper reinforcement; FIG. 4 is a cross-sectional view taken along line IV-IV of FIGS. 2 and 3; and FIG. 5 is a cross-sectional view taken along line V-V of FIGS. 2 and 3. As shown in FIG. 2 the bumper reinforcement 14 has a length and includes three members joined together. That is, the bumper reinforcement 14 is divided into three sections.

As shown in FIG. 2, a central part 14A extending section X1 and lateral parts 14B extending sections X2 are joined by laser welding. The central part 14A and lateral parts 14B have unequal thicknesses; the thickness of the lateral parts 14B may be smaller than that of the central part 14A. In a preferred embodiment, the thickness of the central part 14A may be 2.0 mm, and the thickness of each lateral part 14B may be 1.6 mm, the thickness difference being 0.4 mm. In a preferred embodiment the bumper reinforcement 14 is manufactured using what is called a tailored blank. The joints of unequal thicknesses in the bumper reinforcement 14 originating from the tailored blank are indicated in FIGS. 2 and 3 with reference symbol S.

In a preferred embodiment, the central part 14A and lateral parts 14B may be made of the same material, and typically of steel. However, other materials such as aluminum may also be used. A combination of different materials can be used as far as they can be welded.

In a preferred embodiment the bumper reinforcement 14 may have a generally M-shaped open cross section. This is made because open cross sections can be most effective in strength. The width of the M-shaped open cross section may vary along the longitudinal direction.

As shown in FIG. 2, a central section indicated by Y1 has a relatively narrow constant width. The section Y1 will be called the central narrower section. End sections indicated by Y3 has a relatively wide constant width. The section Y3 will be called the end wider section.

The intermediate section between sections Y1 and Y3 is gradually widened from the width of section Y1 to that of section Y3. This section Y2 will be called an intermediate widening section.

FIG. 4 shows the narrower cross section of the central part 14A within section Y1. FIG. 5 shows a wider cross section of the lateral parts 14B within section Y3. Sections Y2 have a transitional cross section that gradually widens from the narrower cross section of section Y1 to the wider cross section of Y3.

The cross section of the central part 14A within section Y1 shown in FIG. 4, as compared to the cross section of the lateral parts 14B within section Y3 shown in FIG. 5 and described later, has narrower width W1 and larger height H1. This is because in order to allow more air flow to be supplied to the radiator, which is positioned behind the central part 14A to cool the engine. This requires the cross-sectional width W1 to be as narrow as possible while ensuring the required strength.

The elements of the M-shaped open cross section shown in FIG. 4 generally include a front 14a, a top 14b and a bottom 14c. The front 14a has what is called a impact surface in the event of a vehicle collision, which has a recess 14d depressed rearward in the middle in consideration of ensuring strength. Flanges 14e extend vertically from the rear open edges of the top 14b and bottom 14c.

The cross section of the lateral parts 14B shown in FIG. 5, compared to the cross section of the central part 14A shown in FIG. 4 described above, has a larger width W2 and a smaller height H2. That is, the cross-sectional width W2 is wider than the cross-sectional width W1. The width gradually widens from the cross-sectional width W1 and become constant at the cross-sectional width W2. This widening is possible because the lateral parts 14B that do not require so much strength in a collision as the central part 14A described above. In addition, the widening is made to ensure an area enough to mount the crash box 18.

In a preferred embodiment, lateral portions are bent towards the rear relative to the central portion, thereby improving the appearance of the bumper structure. In a preferred embodiment, the cross-sectional width is bent and widened from the boundary of sections Y1 and Y2 toward sections Y2 and Y3. In a preferred embodiment the tailored blank is characterized in that the unequal thickness joints S are located within the intermediate widening sections Y2. This prevents or reduces wrinkles from being formed in the flange 14e in the hot pressing described below.

As shown in FIGS. 2 and 5, at each end there is mounted a crash box that serves as a bumper support structure 18. The mounting position is indicated in phantom lines. Placing the crash box 18 in this position means placing it into the opening of the M-shaped open cross section, as shown in FIG. 5. This provides the crush box 18 with a longer energy absorbing length, which is efficient. However, the bumper support structure 18 does not necessarily comprise a crash box. When some other requirement requires the cross-sectional width of the end portions to be wider, a variety of support structures may be used.

Figure 6:
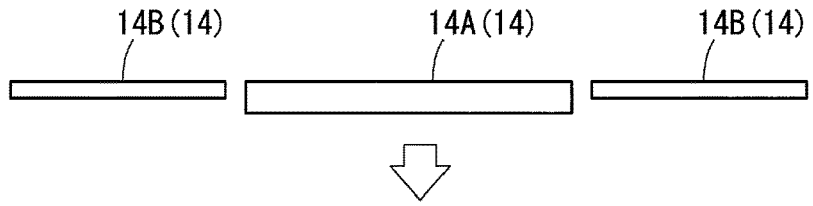
FIG. 6 is a diagram of a manufacturing process for a bumper reinforcement according to an embodiment.
Figure 6:
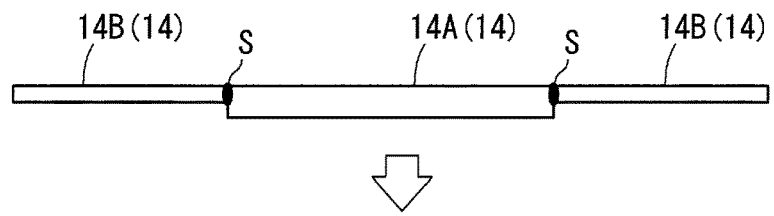
Figure 6:
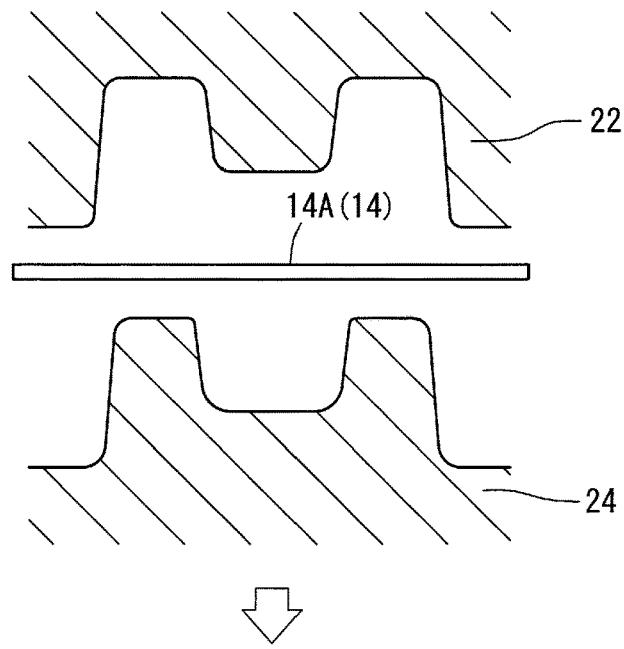
Figure 6:
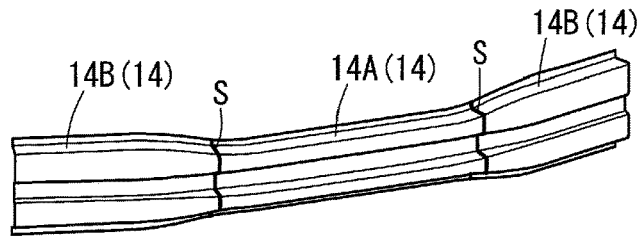

Now a process for manufacturing the bumper reinforcement 14 as described above will be described with reference to FIG. 6. First, in a blank preparation step, blanks for the central part 14A and lateral parts 14B of the bumper reinforcement 14 are provided. The blanks are each made in advance in a predetermined size. Specifically, the blanks are formed such that the joint S of unequal thicknesses comes within the intermediate widening section Y2 when formed in the later hot press step.

In a tailored blank preparation step, the planar blank for the central part 14A and a planar blank for the lateral parts 14B, prepared as above, are then joined together by laser welding. This yields a planar blank having a predetermined shape for forming the bumper reinforcement 14. The welding may also performed by plasma welding.

In a hot pressing step, the planar blank thus prepared in the predetermined shape is then heated to a predetermined temperature suitable for hot forming, and hot pressed between an upper 22 and a lower die 24 into the product form as shown in FIG. 2. It should be noted that the cross-sectional view for the hot pressing step shows the width of the bumper reinforcement 14, which is different from the cross-sectional views for the other steps which show the length of the bumper reinforcement 14.

Figure 7:
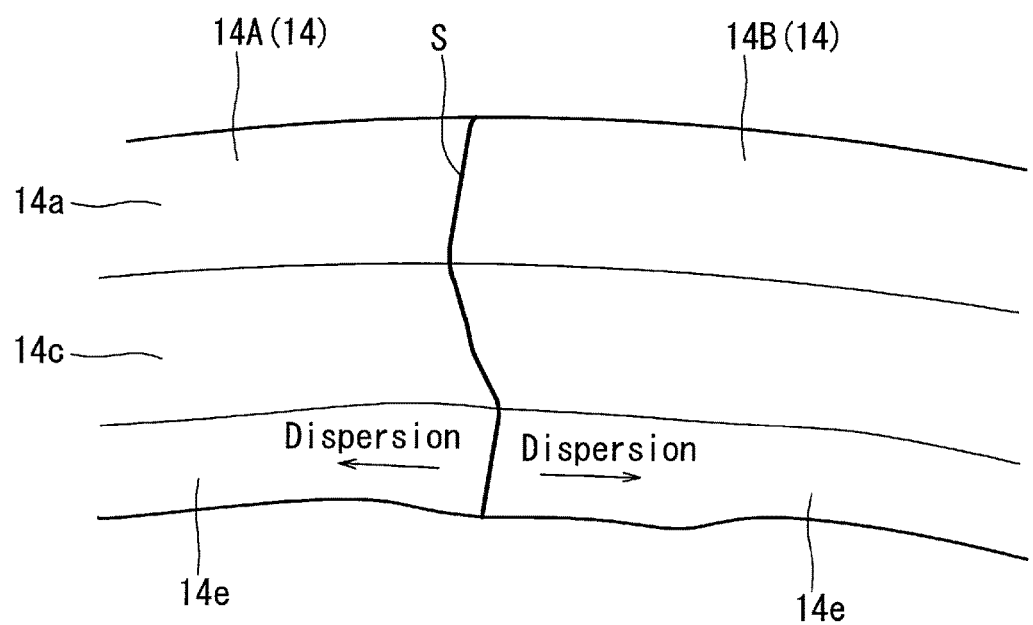
FIG. 7 is an illustration of wrinkles formed in the bumper reinforcement according to an embodiment.

FIG. 7 indicates wrinkles formed in the flange 14e when forming the bumper reinforcement 14 in the hot press step described above. The hot press step in the embodiments described above eliminates low strength regions, preventing the wrinkle concentration in low strength regions as is the case in the prior art that uses cold press forming.

Further, as shown in FIG. 7, the joint S of unequal thicknesses provides a ridge which separates wrinkles being formed in the curved portion and the intermediate widening section Y2, and disperses the wrinkles into the central section X1 and the end sections X2, thereby preventing or reducing wrinkles.

In order to improve the strength of the bumper reinforcement 14 in the embodiment described above, a bracket such as a stiffener plate may be mounted to the flange 14e. This allows the welding to be performed by spot welding, resulting in a lower cost.

While specific embodiments of the present invention have been described, those skilled in the art can make various modifications and substitutions without departing from the purpose and spirit of the present invention.

The invention claimed is:

1. A process for manufacturing a bumper reinforcement having a length, wherein the bumper reinforcement is disposed in front or rear of an automobile body with the length directed in transverse direction of the automobile body, the process comprising:
   joining a central part and lateral parts of unequal thicknesses to form a planar tailored blank; and
   press forming the tailored blank by hot pressing to produce a bumper reinforcement having a length and an M-shaped open cross section,
   the bumper reinforcement being curved at end portions of the length toward the open side of the cross section relative to a central portion,
   the bumper reinforcement comprising a central narrower section, end wider sections having a larger width than the central narrower section, and intermediate widening sections gradually widening from the central narrower section to the end wider sections, such that after the hot pressing the joints of unequal thicknesses between the central part and the lateral parts are located within the intermediate widening section.

2. The process of claim 1, further comprising mounting crash boxes between the end wider sections of the bumper reinforcement and the automobile body.

3. The process of claim 1, the thickness of the central part of the tailored blank being larger than the thickness of the lateral parts.

4. The process of claim 1, the central part and the lateral parts of the tailored blank being made of the same material.

5. The process of claim 1, wherein the step of press forming the tailored blank forms a flange at the opening of the M-shaped open cross section,
the process further comprising welding a stiffener bracket to the flange.

6. The process of claim 1, the bumper reinforcement of the M-shaped open cross section being open longitudinally inward in the automobile.

7. The process of claim 1, the end portions of the length of the bumper reinforcement being curved toward the automobile body relative to the central portion.

8. The process of claim 4, wherein the step of press forming the tailored blank forms a flange at the opening of the M-shaped open cross section, the process further comprising welding a stiffener bracket to the flange.

9. The process of claim 4, the bumper reinforcement of the M-shaped open cross section being open longitudinally inward in the automobile.

10. The process of claim 4, the end portions of the length of the bumper reinforcement being curved toward the automobile body relative to the central portion.

11. The process of claim 3, the central part and the lateral parts of the tailored blank being made of the same material.

12. The process of claim 3, wherein the step of press forming the tailored blank forms a flange at the opening of the M-shaped open cross section, the process further comprising welding a stiffener bracket to the flange.

13. The process of claim 3, the bumper reinforcement of the M-shaped open cross section being open longitudinally inward in the automobile.

14. The process of claim 3, the end portions of the length of the bumper reinforcement being curved toward the automobile body relative to the central portion.

15. The process of claim 11, wherein the step of press forming the tailored blank forms a flange at the opening of the M-shaped open cross section, the process further comprising welding a stiffener bracket to the flange.

16. The process of claim 11, the bumper reinforcement of the M-shaped open cross section being open longitudinally inward in the automobile.

17. The process of claim 11, the end portions of the length of the bumper reinforcement being curved toward the automobile body relative to the central portion.

* * * * *